United States Patent
Moran (10) Patent No.: US 10,623,569 B2
(45) Date of Patent: Apr. 14, 2020

(54) DOCUMENT DETECTION AND ANALYSIS-BASED ROUTING

(71) Applicant: AVAYA INC., Santa Clara, CA (US)

(72) Inventor: Thomas Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 126 days.

(21) Appl. No.: 15/617,580

(22) Filed: Jun. 8, 2017

(65) Prior Publication Data

US 2018/0359363 A1 Dec. 13, 2018

(51) Int. Cl.
- *H04M 3/00* (2006.01)
- *H04M 3/51* (2006.01)
- *H04M 3/523* (2006.01)
- *G06K 9/00* (2006.01)
- *G06F 16/70* (2019.01)
- *G06K 9/32* (2006.01)

(52) U.S. Cl.
CPC .......... *H04M 3/5191* (2013.01); *G06F 16/70* (2019.01); *G06K 9/00456* (2013.01); *G06K 9/00744* (2013.01); *G06K 9/3258* (2013.01); *H04M 3/5235* (2013.01); *H04M 2250/52* (2013.01)

(58) Field of Classification Search
CPC .......... H04M 3/5191; G06K 9/00442
USPC ....... 379/265.01–265.14, 266.01–266.1, 309
See application file for complete search history.

(56) References Cited

U.S. PATENT DOCUMENTS

| | | | | |
|---|---|---|---|---|
| 6,061,056 A | * | 5/2000 | Menard | H04N 5/4401 348/E5.108 |
| 6,185,550 B1 | * | 2/2001 | Snow | G06F 17/3061 |
| 6,651,042 B1 | * | 11/2003 | Field | H04M 1/6505 379/100.05 |
| 8,275,803 B2 | | 9/2012 | Brown et al. | |
| 8,634,543 B2 | | 1/2014 | Flockhart et al. | |
| 9,256,774 B1 | | 2/2016 | Koster | |
| 9,477,401 B2 | * | 10/2016 | Hwang | G06F 3/04883 |
| 2006/0074895 A1 | * | 4/2006 | Belknap | G06F 17/3074 |
| 2009/0190741 A1 | | 7/2009 | O'Connor | |
| 2010/0235218 A1 | | 9/2010 | Erhart et al. | |
| 2010/0296417 A1 | | 11/2010 | Steiner | |
| 2011/0125793 A1 | | 5/2011 | Erhart et al. | |
| 2011/0125826 A1 | | 5/2011 | Erhart et al. | |
| 2011/0206198 A1 | * | 8/2011 | Freedman | G06Q 30/06 379/265.03 |
| 2011/0225031 A1 | * | 9/2011 | Park | G06Q 30/02 705/14.25 |

(Continued)

OTHER PUBLICATIONS

"Text Recognition API Overview," Google, last updated Jun. 27, 2016, 3 pages [retrieved online from: developers.google.com/vision/text-overview].

(Continued)

*Primary Examiner* — William J Deane, Jr.

(74) *Attorney, Agent, or Firm* — Sheridan Ross P.C.

(57) ABSTRACT

A document is often the impetus for a customer to call a contact center. Customers may have access to a video camera which may be utilized to capture an image of the document without requiring the customer to take any action beyond positioning the document in view of the camera. The contact center then determines the video image comprises text, extracts the text, and matches the text to a document. An agent is then selected having an ability to process work items associated with the identified document. The call is then routed to the selected agent.

20 Claims, 4 Drawing Sheets

(56) References Cited

U.S. PATENT DOCUMENTS

| | | | |
|---|---|---|---|
| 2012/0275690 A1 | 11/2012 | Melvin et al. | |
| 2013/0033522 A1* | 2/2013 | Calman | G06Q 30/0633 345/633 |
| 2013/0227258 A1* | 8/2013 | Rumani | G05B 19/0426 713/1 |
| 2014/0012754 A1* | 1/2014 | Hanson | G06Q 20/40 705/44 |
| 2014/0096034 A1* | 4/2014 | Blair | G06Q 10/107 715/752 |
| 2014/0112463 A1 | 4/2014 | Ghesquiere et al. | |
| 2014/0193029 A1 | 7/2014 | Vassilieva | |
| 2014/0325396 A1* | 10/2014 | Sterman | H04L 65/1069 715/756 |
| 2014/0330822 A1* | 11/2014 | Makadia | G06F 17/30026 707/728 |
| 2014/0351913 A1* | 11/2014 | McGilliard | H04L 63/104 726/7 |
| 2015/0078671 A1* | 3/2015 | van Deventer | G06K 9/00463 382/217 |
| 2015/0261836 A1* | 9/2015 | Madhani | G06F 17/30563 707/602 |
| 2015/0363431 A1* | 12/2015 | Fox | H04L 43/08 707/748 |
| 2016/0133148 A1* | 5/2016 | Hanks | G09B 7/06 434/309 |
| 2017/0193293 A1* | 7/2017 | Mattes | G06Q 20/4014 |
| 2017/0286796 A1* | 10/2017 | Isaev | G06K 9/00449 |
| 2017/0329858 A1* | 11/2017 | Adamy | G06F 16/24578 |
| 2018/0025222 A1* | 1/2018 | Yellapragada | G06K 9/00442 382/176 |
| 2018/0219681 A1* | 8/2018 | Geiman | H04L 9/3234 |
| 2018/0249218 A1* | 8/2018 | Sayman | H04N 21/47205 |
| 2018/0285799 A1* | 10/2018 | Davies | G06Q 10/06313 |
| 2019/0007469 A1* | 1/2019 | Sanso | H04L 65/403 |
| 2019/0045052 A1* | 2/2019 | Kats | H04M 1/274516 |

OTHER PUBLICATIONS

"Watson Services," IBM, as of Sep. 3, 2016, 4 pages [retrieved from: www.ibm.com/watson/developercloud/services-catalog.html].

\* cited by examiner

DOCUMENT DETECTION AND ANALYSIS-BASED ROUTING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for document detection and particularly to document detection in a video stream and responses to the detection thereof.

BACKGROUND

When a customer calls into a contact center, typically they must interact with an interactive voice response (IVR) system or a voice recognition system and provide multiple inputs before they are connected to the correct agent who will assist them.

In many cases, the customer may be calling about a specific piece of textual information that the vendor previously supplied to the customer (e.g. an insurance renewal or quote, sales literature, an order document, etc.). The customer must determine and select the appropriate response option and/or explain the nature of the call to a human agent. The call is then processed by the same human agent or routed to a qualified agent.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, various aspects of Artificial Intelligence (AI), which may include text detection, text extraction, and document matching, are used in concert with each other at the initial stages of a customer call to analyze the call's incoming video stream. The call may then be routed automatically and more accurately based on the AI analysis, with optional screen pops or presentations of related information provided to the selected agent receiving the call.

In another embodiment, an incoming call with video enabled is automatically analyzed by an AI engine to detect the presence of textual information, extract the textual information, match the textual information with a stored document(s) and then route the call based on the content of the textual information.

Embodiments of the current disclosure provide systems and methods to automatically route a customer's call to a relevant agent by providing a video stream of the textual information to the contact center's Interactive Video Voice Response (IVVR) unit. Once a camera captures an image of the textual information in the video stream, routing may be performed based on the textual information and without human intervention.

After calling a contact center with a video-enabled device, a customer is automatically connected to an IVVR system (Interactive Video Voice Response) or other device operable to screen the call to determine which resource of the contact center is best able to process the call. The customer then points their device camera at a specific document about which they are calling. In many cases the specific document will be an item that was previously sent by or on behalf of the vendor, a template or copy of which will be maintained in a database or other document repository. For example, the document could be an insurance renewal, an invoice, sales literature, a contract or legal document, etc. After pointing the camera at a subject document, no additional human intervention is required.

In another embodiment, as soon as the customer is connected to the IVVR system, an AI engine is automatically requested to analyze the incoming video stream. The resultant AI analysis provides a classification, with a high probability, that the video stream is primarily comprised of textual information. In a further embodiment, calls that are determined to not comprise text can be omitted from further processing as such calls do not require subsequent textual analysis.

In another embodiment, after the image has been positively determined to comprise textual content, a second AI engine extracts the text content from the video stream. In another embodiment, the text content is passed to a third AI engine which searches the vendor's documentation repository for a document match. In a further embodiment, identification of the document may then provide the impetus to route the call to a particular agent or classification of agents. Optionally, the textual content of the document may be used to access and retrieve additional information regarding this matched document. For example, the particular agent selected to receive the call may be also be presented with information regarding processing an overdue insurance renewal (e.g., presenting to the agent a screen associated with processing of overdue renewals) based on the textual information indicating the customer's document is an overdue notification.

The extracted text and any additional contextual information may then be used to route the call to a specific agent to process the customer's request. After routing to an agent, the video stream may be discontinued. Optionally, the video stream may be discontinued earlier, such as when a portion of the video stream is determined or assumed to be sufficient for subsequent analysis. While benefits may be realized by providing real-time or near real-time analysis of the video stream to identify a subject document, in another embodiment, the video stream may be recorded and analyzed after the video stream has terminated. For example, a customer may call a contact center, present a document to the camera of a device, and the contact center records the video, and selects an agent based on the identity of the document, the agent then performs a call-back to the customer to resolve the issue associated with the call.

In another embodiment, the three AI engines may be combined into two or one AI engine. A single AI engine providing the service of two or more AI engines (as described above) may utilize different APIs to access to the different functionality of a single AI engine, depending on the type of analysis required. Alternatively, this functionality could be made available via a single API utilizing different encoded instructions.

The third AI engine may return a single document or a listing of documents. The list may comprise an indication of relevance (e.g., relevance score, presented in relevance order, etc.), which may further comprise an input into the routing decision. The call may be routed to an agent selected has having a skill to process a work item associated with the document having the highest relevant score or a plurality of documents having an aggregate relevance score. For example, three documents may be determined to be candidate documents. One document, an insurance application, is determined to be a 40% match. Two other documents, an automobile insurance renewal and a personal property insurance renewal, are determined to each have a 30% match. Accordingly, the call may be routed to an agent selected for processing insurance renewals as the aggregate score indicates the topic is "insurance renewal," even if the insurance application has the single highest relevancy score.

It should be appreciated that, from the customer's perspective, the entire process is greatly streamlined—the customer simply makes a call to the contact center and points their smartphone camera or other connected camera at the relevant document in their possession, and thereby omits having to select options from a complex user interface or navigate the usual IVR prompts to, "dial 1 for x, dial 2 for y, etc." The ensuing AI analysis and routing of the call is automatic with no further human intervention required by the customer. The customer is then connected with the selected agent who, with benefit of the embodiments herein, is able to provide improved service to the customer.

Alternatively, the selected agent is an automated agent having a particular ability to process calls associated with the identified document. Once an appropriate automated agent is determined, the call may be routed to or joined by the appropriate automated agent. For example, in the case of an insurance renewal, the call may be readily processed via an automated agent configured to accept payments over the phone and, accordingly, routed to an IVR payment system.

In one embodiment, a system is disclosed, comprising: a network interface; a data storage; and a processor performing: conducting, via the network interface, a call with a communication device; determining the call comprises a video portion; determining the video portion comprises text; extracting text from the video portion; matching the extracted text to a document in the data storage; selecting a resource designated for processing calls associated with the document; and routing the call to the selected resource.

In another embodiment, a method is disclosed, comprising: conducting, via a network interface, a call with a communication device; determining the call comprises a video portion; determining the video portion comprises text; extracting text from the video portion; matching the extracted text to a document in a data storage; selecting a resource designated for processing calls associated with the document; and routing the call to the selected resource.

In another embodiment, a system is disclosed comprising: means to receive a call; means to determine an impetus of the call is a topic associated with a document; means to capture a video image; means to determine the video image comprises text; means to extract text from the video image comprising text; means to match the extracted text to a document; means to select a resource having a skill associated with the document to process the call; and means to route the call to the selected resource.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
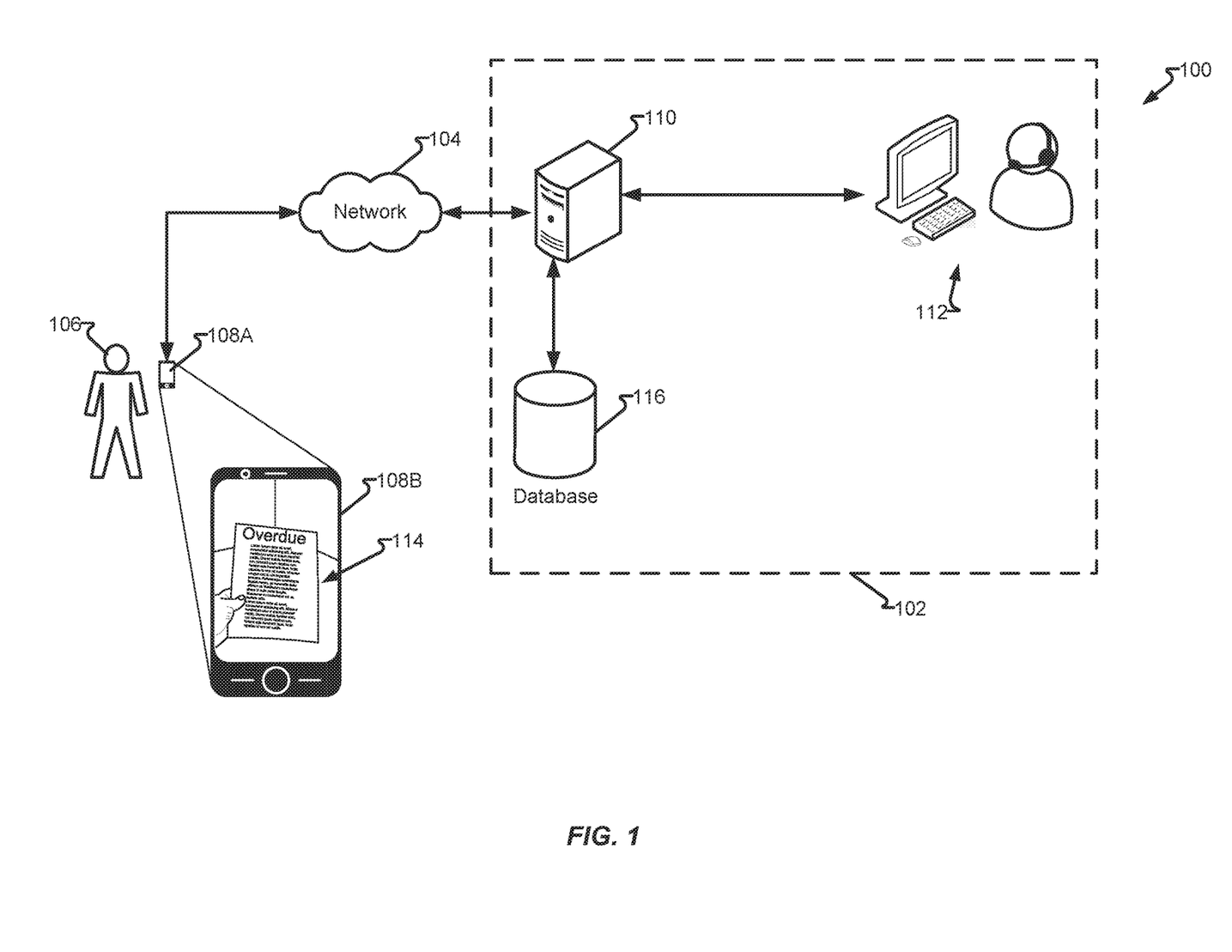
FIG. 1 depicts a first system in accordance with embodiments of the present disclosure.

FIG. 1 depicts system 100 in accordance with embodiments of the present disclosure. In one embodiment, customer 106 utilizes customer communication device 108 to communicate with components of contact center 102. In one embodiment, customer 106 initiates a call (audio only or audio visual) or other interaction (e.g., text), which may utilize a Session Initiation Protocol (SIP) call via network 104 which is initially answered by server 110. An Interactive Voice Response (IVR), Interactive Voice/Video Response (IVVR), or other prompt interacts with customer 106, via customer communication device 108, and determines customer 106 is calling about a document known to a company, such as a vendor, comprising and/or utilizing contact center 102 as a customer service provider.

In response to the determination that customer 106 is calling about a document, server 110 prompts customer 106 to place the subject document in view of a camera integrated into customer communication device 108. Server 110 may automatically activate a camera associated with customer communication device 108. In another embodiment, server 110 causes customer communication device 108 to prompt customer 106 to grant permission for server 110 to utilize the camera. In yet another embodiment, server 110 causes customer communication device 108 to prompt customer 106 to activate the camera. The prompt provided by server 110 may be visual (e.g., text message, graphic, icon, animation, etc.) and/or audible (e.g., spoken instruction, tone(s), etc.). The signal provided to camera, via customer communication device 108, may comprise a SIP message requesting video or other communication format message, such as a request for a real-time transport protocol (RTP) session comprising video. In another embodiment, the signal may include, but is not limited to, a proprietary signal to a proprietary application executing on customer communication device 108 which may be utilized by customer 106 for calling contact center 102. Once utilization of the camera is authorized, unless authorization is automatically provided or not necessary, customer 106 need only present document 114 for viewing by the camera. Manually activating a physical or electronic camera shutter is omitted. Once server 110 has captured a video stream comprising document 114, the video portion may be terminated automatically by server 110 or customer communication device 108 to return to the call mode prior to the initiation of video (e.g., audio only, text only). When the call is a video chat, the call may resume normally.

In another embodiment, server 110 may provide aids to resource 112 to assist resource 112 in processing the call with customer 106. For example, server 110 may present a template version of document 114, a specific version of document 114 associated with customer 106, launch an application associated document 114, prepopulate a form with known information associated with document 114, provide cues in processing the call with customer 106 (e.g., screen pop, whisper channel inputs, etc.). For example, if document 114 is a notice of an overdue insurance premium, server 110 may launch a payment acceptance application prepopulated with known information (e.g., customer 106 may have been identified and the payment system prepopulated with the name, address, etc. of customer 106).

In another embodiment, the specific identity of document 114 may not be positively determined. Server 110 may present resource 112 with a list of candidate options and, thereby, reduce or eliminate options that are not likely candidates. For example, the fact that document 114 is in the possession of customer 106 may infer that an entity associated with contact center 102 (e.g., a company or organization that comprises and/or hires contact center 102 to operate on its behalf) has previously interacted with or has knowledge of customer 106. Therefore, any type of work item associated with an unknown party can be excluded from the work item presented to customer 106. Work items not associated with any document may also be eliminated (e.g., customer 106, having document 114, is less likely to be calling to obtain their account balance).

In another embodiment, the correctness, or lack thereof, of the aid provided to resource 112 may be determined during or following the call. The correctness then providing feedback to server 110 to improve subsequent encounters with a particular document. For example, if document 114 resembles more than one form and a particular form may be assumed. The assumed document may lead to the presentation of a particular aid to resource 112. If resource 112 dismisses the aid or selects a different aid or action inconsistent with the assumed document (e.g., causes the call to be rerouted to a different agent), server 110 may self-learn and select actions the assumed document less frequently. Additionally, the known or suspected identity of customer 106 may be utilized to further refine the selection of an aid for presentation to resource 112. For example, document 114 is determined to be either an application for a personal loan or an application for a mortgage without a clear distinction between the two. If it is known or suspected that customer 106 is located in an area recently canvased with a direct-mail application for personal loans, server 110 may then select resource 112 and/or an aid to present to resource 112 in accordance with document 114 more likely being a personal loan application. In another embodiment, the resource 112 selected may be selected in accordance with a topic associated with a document. For example, document 114 may be an advertisement and resource 112 may be selected in accordance with a topic associated with the advertisement, such as, purchasing, leasing, financing, details of, variations of, alternatives to, samples of, demonstrating, or other topic associated with the item advertised. Topics may be eliminated from consideration by server 110 as well. For example, document 114 is an insurance payment notification, therefore topics such as a new insurance application may be eliminated from consideration. Other topics, such as changes of address or other administrative issues may be evaluated to have a lower likelihood in light of identified customer 106 having been sent an overdue payment notification. In yet another embodiment, a topic may be determined by a particular portion of document 114. For example, an insurance policy may not have a payment deadline, but have a payment anniversary that has past. Accordingly, a topic related to reinstatement of insurance, fee payments, etc. may be determined.

In another embodiment, resource 112 is selected from a pool of resources which may be divided into automated and human resources, and skills/abilities associated therewith. For example, document 114 may be a payment notification and server 110, upon determining the identity of document 114, routes the call with customer 106 to an automated agent, such as an IVR, to collect credit card or other payment means and credit the payment to the account of customer 106.

In another embodiment, server 110 selects a particular agent (e.g., resource 112) to process the call. Server 110 may access a repository of documents in database 116 and make a determination of whether the video image of document 114 matches one of the documents maintained in database 116. Upon determining a match, server 110 then selects the particular resource (e.g., one of resources 112) to receive the call and connects or enqueues the call with resource 112. The selection of resource 112 may be supplemented by other factors, such as time until the agent is available or as having a particular skill (e.g., speaking the same language as customer 106).

The extracted text may be determined to match one of a plurality of documents within database 116. In one embodiment, customer 106 may be prompted to present an alternative portion of document 114 to the camera, such as to allow the camera and subsequent processes to view differentiating text associated with a particular document. In another embodiment, a degree of match may be utilized to identify a most likely document from a plurality of documents. For example, if legible text is extracted from the video image that is common to a plurality of documents, but differentiating text is obscured or illegible, then server 110 may score the likelihood of each candidate document being a match to document 114. For example, if one document is generally more popular then another, the more popular document may be assumed (e.g., three percent of overdue notifications are related to home mortgages and ninety-seven percent of overdue notifications are related to personal loans and, therefore, provided a higher relevancy score). Scoring may be based on identification or attribute of customer 106. For example, if customer 106 is known or suspected to live in region where a company associated with contact center 102 does not issue mortgages, then scoring may then reflect the unlikely event that document 114 is or is related to a mortgage.

Database 116 may be one or more data storage devices or components including, but not limited to, an external and/or internal magnetic, electronic, and/or optical media, connected plurality of devices, connected remote storage device or devices (e.g., storage as a service, "cloud," etc.), or other storage medium accessible to server 110. Similarly, server 110 may comprise a single processor on a computing device, plurality of processors, plurality of servers, remote server (e.g., processing as a service, "cloud" processing, etc.), or other accessible hardware operable to execute instructions and, alone or via signals to a routing device, connect resource 112 to customer communication device 108 for communications therebetween.

Customer communication device 108 may comprise a camera (e.g., camera integrated into a smart phone, camera integrated into a tablet or portable computer) or an associated camera (e.g., a web camera wired or wireless attached to a desktop computer). Customer communication device 108 is illustrated as customer communication device 108A, as being utilized by customer 106, and enlarged view 108B presently displaying the contents captured by an integrated camera (not shown) which presently comprise document 114.

Figure 2:
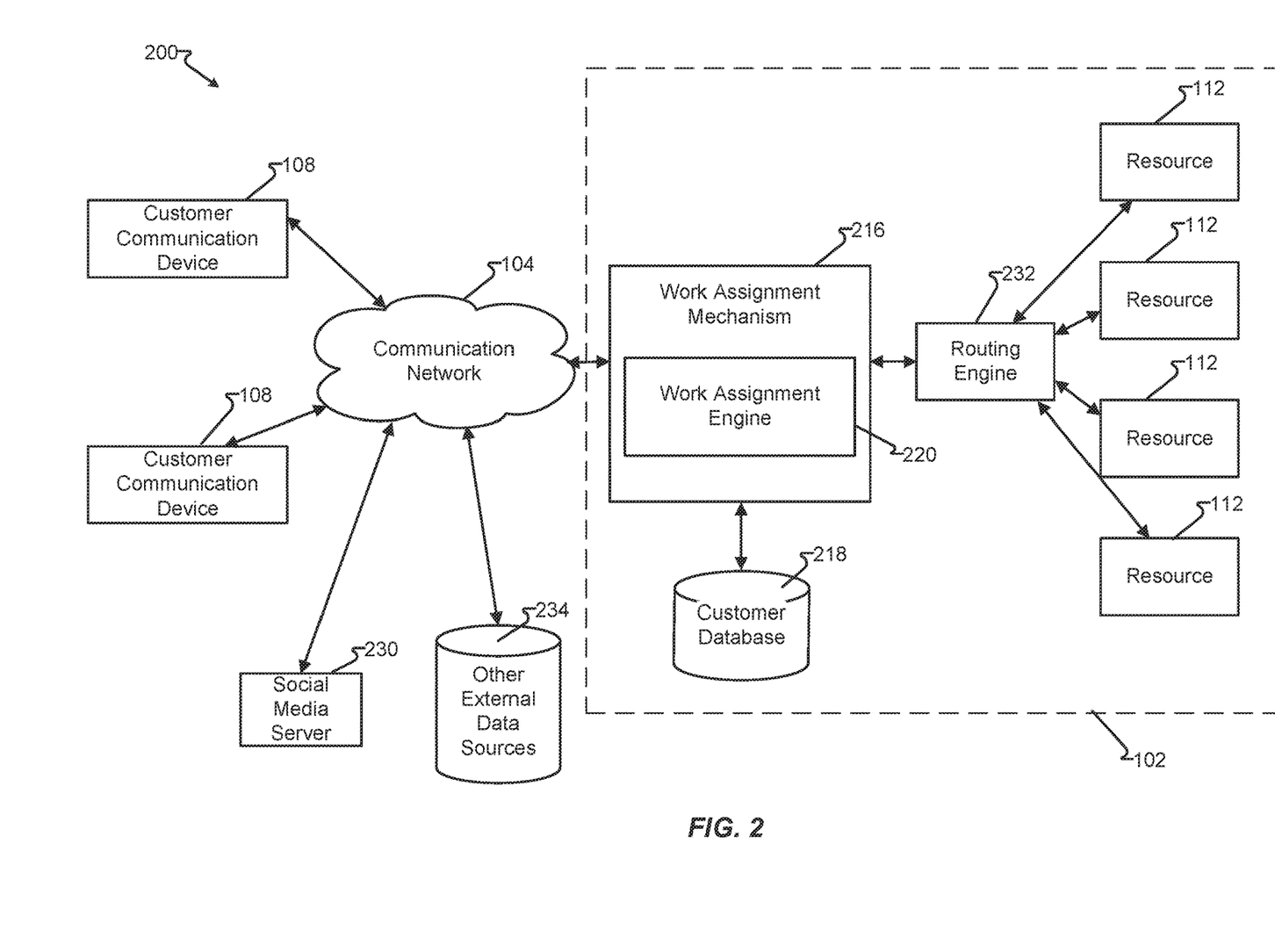
FIG. 2 depicts a second system in accordance with embodiments of the present disclosure.

With reference now to FIG. 2, communication system 200 is discussed in accordance with at least some embodiments of the present disclosure. The communication system 200 may be a distributed system and, in some embodiments, comprises a communication network 104 connecting one or more communication devices 108 to a work assignment mechanism 216, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 218, and/or other component may connect to routing engine 232 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 230 and/or other external data sources 234 may be within contact center 102 physically and/or logically, but still be considered external for other purposes. For example, contact center 102 may operate social media server 230 (e.g., a website operable to receive user messages from customers and/or resources 112) as one means to interact with customers via their customer communication device 108.

Routing engine 232, work assignment mechanism 216, and/or work assignment engine 220 may comprise, be comprised by, in communication with, and/or co-executed by shared hardware with server 110.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 230 and/or other external data sources 234 may be utilized to provide one means for a resource 112 to receive and/or retrieve contacts and connect to a customer of a contact center 102. Other external data sources 234 may include data sources, such as service bureaus, third-party data providers (e.g., credit agencies, public and/or private records, etc.). Customers may utilize their respective customer communication device 108 to send/receive communications utilizing social media server 230.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, and combinations thereof. In some embodiments, the communication may not necessarily be directed at the work assignment mechanism 216, but rather may be on some other server in the communication network 104 where it is harvested by the work assignment mechanism 216, which generates a work item for the harvested communication, such as social media server 230. An example of such a harvested communication includes a social media communication that is harvested by the work assignment mechanism 216 from a social media network or server 230. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 216). The communication may be received and maintained at the work assignment mechanism 216, a switch or server connected to the work assignment mechanism 216, or the like, until a resource 112 is assigned to the work item representing that communication. At which point, the work assignment mechanism 216 passes the work item to a routing engine 232 to connect the communication device 108, which initiated the communication, with the assigned resource 112.

Although the routing engine 232 is depicted as being separate from the work assignment mechanism 216, the routing engine 232 may be incorporated into the work assignment mechanism 216 or its functionality may be executed by the work assignment engine 220.

In accordance with at least some embodiments of the present disclosure, the communication devices 108 may comprise any type of known communication equipment or collection of communication equipment operable to provide a video feed to a component of contact center 102. Examples of a suitable communication device 108 include, but are not limited to, a personal computer, laptop, Personal Digital Assistant (PDA), smart phone, digital telephone, or combinations thereof. In general, each communication device 108 may be adapted to support video and audio and optionally text and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 216 and routing engine 232. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 216 and resources 112 may be owned and operated by a common entity in a contact center 102 format. In some embodiments, the work assignment mechanism 216 may be administered by multiple enterprises, each of which has its own dedicated resources 112 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queueless contact center 102, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 102.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 102. Customer database 218 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 216. The message received by a contact center 102, such as at the work assignment mechanism 216, is generally, and herein, referred to as a "contact." Routing engine 232 routes the contact to at least one of resources 112 for processing.

Figure 3:
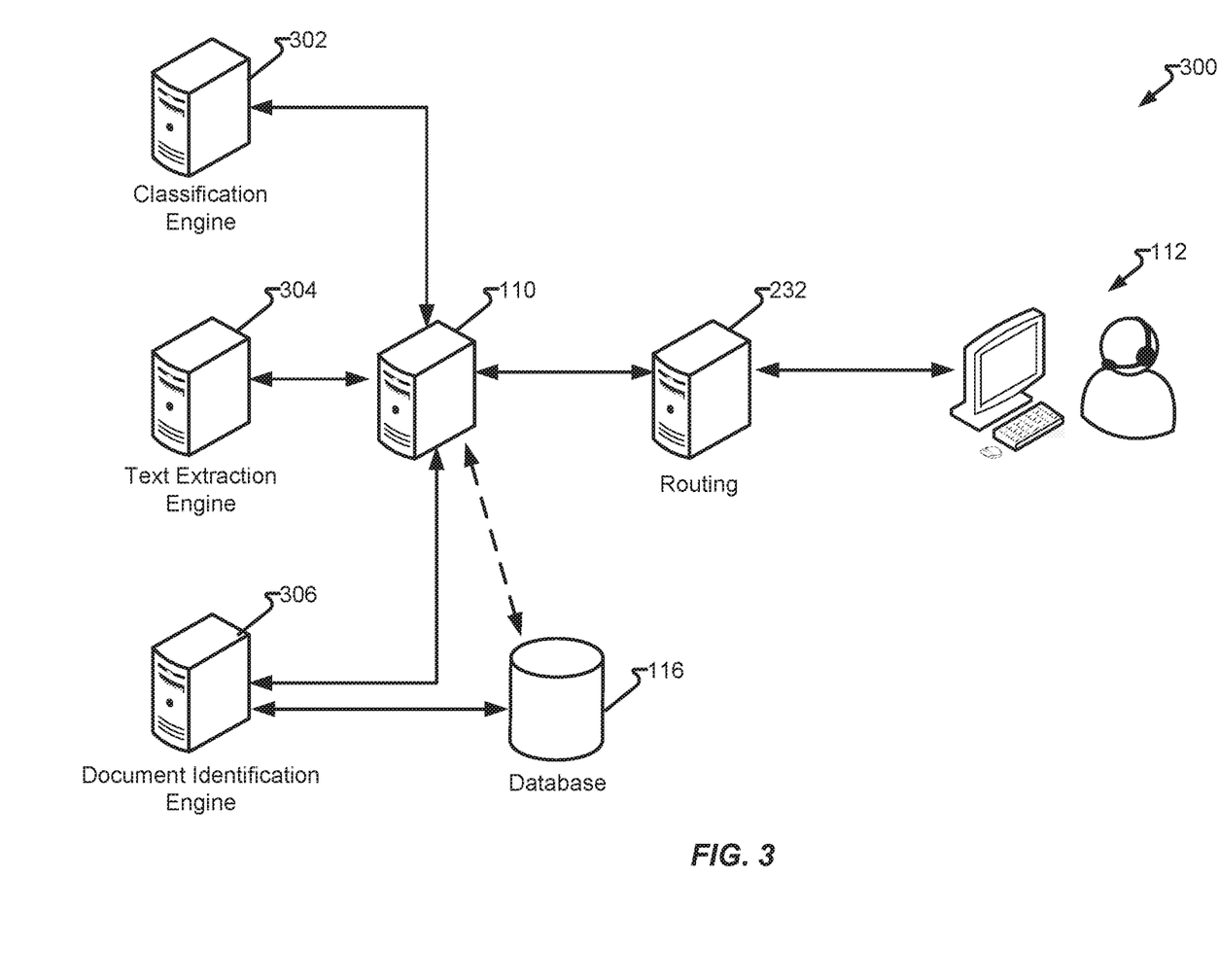
FIG. 3 depicts a third system in accordance with embodiments of the present disclosure.

FIG. 3 depicts system 300 in accordance with embodiments of the present disclosure. In one embodiment, server 110 receives a call from a customer, such as customer 106 utilizing customer communication device 108. The received call is variously embodied, including audio only, audio-video, or text. If video is not currently provided, server 110 signals the customer communication device to initiate video and for customer 106 to present a document to the associated camera to capture a video image of a subject document, such as document 114.

Next, server 110 executes or causes to execute, classification engine 302. Classification engine determines if the content of the captured video comprises textual information. If classification engine determines text is absent from the captured video, server 110 may be notified accordingly. Server 110 may then respond to customer 106 to indicate that that no textual information has been received (e.g., "Show the document to the camera. Waiting . . . "). Alternatively, server 110 may conclude that the video is devoid of textual information and route the call accordingly, such as to a particular resource 112 associated with general matters or matters not associated with a particular document or for re-route screening.

If classification engine 302 determines the captured video image does comprise text, text extraction engine 304 then extracts the textual information. The extracted text is then analyzed by document identification engine 306 to determine a match with a particular document, such as may be stored in database 116. Document identification engine 306 then provides and/or identifies the document from database 116 to server 110. Server 110 then causes routing engine 232 to route a work item associated with the call, and with benefit of knowledge of the imaged document, to a selected resource 112. Server 110 and/or routing engine 232 may further provide an aid to resource 112 selected in accordance with the identity of the imaged document.

It should be appreciated that alternative configurations of system 300 may be utilized without departing from the scope of the embodiments provided herein. While classification engine 302, text extraction engine 304, document identification engine 306, server 110, database 116, and routing engine 232 are, in one embodiment, distinct networked components. In other embodiments, any two or more of the forgoing components may be combined or combined with components not shown to provide the functionally described. As a further embodiment, the arrangement of the components illustrated may also be altered without departing from the scope of the embodiments provided herein.

Figure 4:
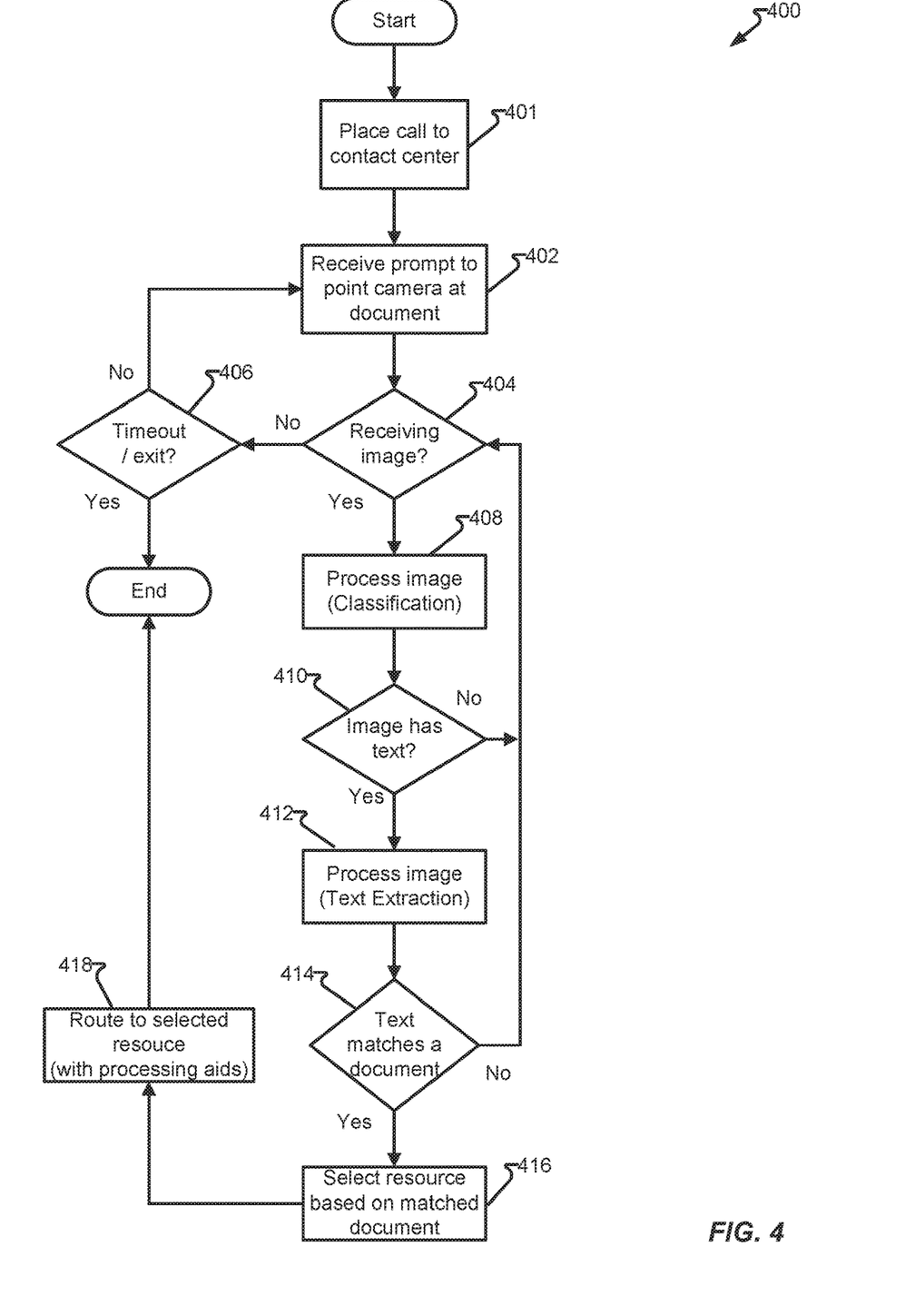
FIG. 4 depicts a process in accordance with embodiments of the present disclosure.

FIG. 4 depicts process 400 in accordance with embodiments of the present disclosure. In one embodiment, step 401 places a call to a contact center, such as by customer 106 utilizing customer communication device 108 to call a component of contact center 102, such as server 110. The call may then be associated and/or identified as a work item and may comprise, audio, video, or text. Step 402 prompts customer 106 to place a document related to the purpose of the call in view of a camera, such as a camera integrated into or in communication with customer communication device 108. Step 402 may be omitted if the document is already in view of the camera.

Next, step 404 determines if the video image is being received. If step 404 is determined in the affirmative, process 400 proceeds to step 408. If step 404 is determined in the negative, process 400 may loop to step 406 and, if not a timeout condition, loop back to step 402 or other step. Loop formed by step 402, 404, 406 may execute until either step 404 is determined in the affirmative or step 406 is determined in the affirmative. Step 406 may be a timeout event, number of iterations attempted, or other termination event occurs, such as a signal from customer 106 via customer communication device 108 indicating that video cannot or will not be provided. Step 402 may be continuous (e.g., "Activate camera. Waiting . . . "), different (e.g., "Try again."), diagnostic (e.g., "Make sure your camera is connected," "Authorize use of the camera and try again."), or a combination thereof.

If the video communication session cannot be established, and step 406 is determined in the affirmative, process 400 may be terminated and the call routed to a particular resource resources 112, selected as a resource for process calls without video and/or video content.

If step 404 is determined in the affirmative, step 408 then processes the image for the determination of the presence of textual information. Step 410 determines if text is present and, if so, processing continues to step 412. If step 410 is determined in the negative, processing may loop back to step 404. For example, customer 106 may be in the process of positioning the camera and document and, for an initial period of time, the video image captured may be a background scene. Once the document is correctly positioned, step 408 continually or intermittently analysis the image and, if text is present, step 410 is determined in the affirmative. In another embodiment, if the image is determined to not comprise text, or not comprise legible text, process 400 may continue to loop, such as by execution of at least steps 404 and 408. Server 110 may optionally prompt customer 106, via signal to customer communication device 108, to perform remedial or troubleshooting action (e.g., "Receiving video. Place document in view of camera," "Document not detected," "Too jittery, please steady camera," "Move camera and document closer together," etc.). Another timeout or exit (not shown) may be incorporated such as to abandon image capturing of the document or if customer 106 determines that a suitable quality image of the document cannot be obtained. In which case process 400 may terminate early and be routed to a resource 112 based on a generic or at a non-text containing video routing decisions.

If step 410 is determined in the affirmative, step 412 executes to extract text from the video image and step 412 then determines if the text matches a known document. If step 414 is determined in the negative, process 400 may loop back to step 404 or other looping may occur. For example, customer 106 may be adjusting the view of a camera associated with customer communication device 108 that captures an image of a newspaper on desk. While video with text is present, step 414 may determine the text is not associated with a document. Accordingly, process 400 may loop until such time as a document-extracted text do match, or until a timeout or exit (not shown) occur. For example, customer 106 may have mislaid the document prior to initiating the call and via timeout or explicit signal (e.g., "Proceed without imaging document.") the call is processed in a manner selected for non-document matching routing decisions.

If step 414 is determined in the affirmative, process 400 continues to step 416 whereby a particular resource is selected from a pool of resources 112 based upon the document presented to customer communication device 108. Step 416 may select an individual resource 112 or a class of resources 112. For example, the call received in step 402 may be enqueued for the next available resource 112, from a pool of resources, having a particular skill (e.g., subject matter expertise, foreign language expertise, etc.). Step 418 then routes the call accordingly. Optionally, step 418 provides processing aids to accompany or in anticipation of resource 112 processing the call. For example, identification of the document (e.g., "Customer has an overdue payment notification."), a template copy of the document, a customer-specific copy of the document, launch an application associated with the document, provide a script associated with the document, and/or other aid. The particular resource 112 then processes the call and process 400 may then terminate.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). In another embodiment, a processor may be a system or collection of processing components, such as a processor on a client device and a processor on a server, a collection of devices with them on respective processor, or a shared or remote processing service (e.g., "cloud" based processor). A system of processors may comprise task-specific allocation of processing tasks and/or shared or distributed processing tasks.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., processors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a processor may comprise a first processor on one component and a second processor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a network interface;
    a data storage; and
    a processor performing:
        conducting, via the network interface, a call with a communication device;
        signaling the communication device to provide a video portion originating from the communication device;
        determining that the video portion comprises text, upon determining whether the call comprises the video portion originating from the communication device;
        extracting the text from the video portion;
        upon determining that the video portion is no longer required,
        signaling the communication device to discontinue providing the video portion;
        matching extracted text to a document in the data storage;
        selecting a resource designated for processing calls associated with the document; and
        routing the call to the selected resource.

2. The system of claim 1, wherein the processor further performs, signaling the communication device to provide the video portion.

3. The system of claim 2, further comprising the processor performing:
    receiving the call; and
    screening the call to determine a subject of the call is associated with the document prior to signaling the communication device to provide the video portion.

4. The system of claim 2, further comprising the processor performing:
    determining that the video portion is no longer required; and
    signaling the communication device to discontinue providing the video portion.

5. The system of claim 1, further comprising the processor performing:
    selecting a processing aid associated with the document; and
    causing a device associated with the selected resource to present the processing aid.

6. The system of claim 5, further comprising the processor causing the device associated with the selected resource to present the aid as a screen-pop.

7. The system of claim 5, further comprising the processor causing the device associated with the selected resource to launch an application associated with the document.

8. The system of claim 1, wherein the selected resource is designated for processing the calls associated with a topic associated with the document.

9. The system of claim 1, wherein:
    the processor performs matching the extracted text to each of a plurality of documents in the data storage, wherein the document comprises one of the plurality of documents;
    the processor determines a degree of match between the extracted text and each of the plurality of documents; and the processor performs selecting the resource designated for processing the calls associated with the one of the plurality of documents having a greatest degree of match.

10. The system of claim 7, wherein the processor performs selecting the resource designated for processing the calls associated with the document and the at least one other document.

11. A method, comprising:
conducting, via a network interface, a call with a communication device;
determining that the call comprises a video portion originating from the communication device;
signaling the communication device to provide the video portion;
determining whether the video portion comprises text;
upon determining that the video portion comprises the text, extracting the text from the video portion;
matching the extracted text to a document in a data storage;
selecting a resource designated for processing calls associated with the document; and
routing the call to the selected resource.

12. The method of claim 11, further comprising, signaling the communication device to provide the video portion.

13. The method of claim 12, further comprising:
receiving the call; and
prior to signaling the communication device to provide the video portion, screening the call to determine if a subject of the call is associated with the document.

14. The method of claim 11, further comprising:
selecting a processing aid associated with the document; and
causing a device associated with the selected resource to present the processing aid.

15. The method of claim 14, wherein the aid comprises launching an application associated with the document.

16. A system comprising:
means to receive a call from a communication device;
means to determine an impetus of the call is a topic associated with a document;
means to capture a video image originating from the communication device;
means to determine whether the video image comprises text;
upon determining that the video image comprises the text, means to extract the text from the video image comprising the text;
means to match the extracted text to the document;
means to select a resource having a skill associated with the document to process the call; and
means to route the call to the selected resource.

17. The system of claim 16, wherein the selected resource is designated for processing calls associated with the topic associated with the document.

18. The system of claim 16, wherein:
means to match the extracted text to each of a plurality of documents in the data storage, wherein the document comprises one of the plurality of documents;
means to determine a degree of match between the extracted text and each of the plurality of documents; and
means to select the resource designated for processing calls associated with the one of the plurality of documents having a greatest degree of match.

19. The system of claim 16, further comprising:
means to select a processing aid associated with the document; and
means to cause a device associated with the selected resource to process the processing aid with the call.

20. The system of claim 16, wherein the means to cause a device associated with the selected resource to process a processing aid with the call, further comprises, means to cause the device to present a screen-pop comprising the processing aid to a human portion of the resource.

* * * * *

UNITED STATES PATENT AND TRADEMARK OFFICE
CERTIFICATE OF CORRECTION

PATENT NO. : 10,623,569 B2
APPLICATION NO. : 15/617580
DATED : April 14, 2020
INVENTOR(S) : Thomas Moran

Page 1 of 1

It is certified that error appears in the above-identified patent and that said Letters Patent is hereby corrected as shown below:

In the Claims

At Column 19, Line 7, Claim 10 after "the document and" delete "the" therein.

Signed and Sealed this
Twenty-fifth Day of August, 2020

Andrei Iancu
*Director of the United States Patent and Trademark Office*